Feb. 2, 1965  YOSHIHARU NAITO  3,168,361
SHIFTABLE STACK ASSEMBLY
Filed Oct. 9, 1962  6 Sheets-Sheet 1

INVENTOR
YOSHIHARU NAITO

INVENTOR
YOSHIHARU NAITO

Feb. 2, 1965  YOSHIHARU NAITO  3,168,361
SHIFTABLE STACK ASSEMBLY
Filed Oct. 9, 1962

INVENTOR
YOSHIHARU NAITO

United States Patent Office 3,168,361
Patented Feb. 2, 1965

3,168,361
SHIFTABLE STACK ASSEMBLY
Yoshiharu Naito, % Elecompack Company Ltd.,
3rd Floor, Yachiyo Bldg., Tokyo, Japan
Filed Oct. 9, 1962, Ser. No. 229,373
Claims priority, application Japan, Apr. 26, 1962,
37/15,986
15 Claims. (Cl. 312—199)

The present invention relates to stack assemblies, for example, for accommodating books and particularly to shiftable stack assemblies of the character described.

Book-stacks such as employed in stack rooms of a library must be freely accessible to allow the librarian to take in and out any desired book or books as occasion calls. With conventional book-stacks, therefore an aisle or passageway must be provided between adjacent book-stacks which has a width large enough to allow the librarian to walk freely therethrough and thus requires an extra floor space.

The present invention has for its object to provide a movable or shiftable stack assembly which is adapted to accommodate articles such as books in quantities in a minimized floor space eliminating the need of any extra floor space for aisles as indicated above while allowing a person to take in and out any desired article or articles as occasion calls. According to the present invention, there is provided a shiftable stack assembly which comprises a plurality of stacks arranged on the room floor in side-by-side relation for transverse movement relative to the floor and to each other. The stacks are normally arranged substantially in close contact with each other and any stack may be readily shifted in a transverse direction as required to form an aisle in front of that stack which is required to be accessible for taking in or out a desired article or articles.

It will be appreciated that the shiftable stack assembly according to the present invention only requires a floor space which corresponds to the total of floor areas required for the respective stacks plus a floor area required to form a single appropriate aisle. It has been found in one practical example that a stack room having a floor space just enough to accommodate forty book-stacks of the conventional type can accommodate from one-hundred to one-hundred-and-ten book-stacks according to the present invention. It has also been found that the cost of air conditioning of a stack room installed with stack assemblies according to the present invention is reduced markedly, that is, to about one-third as compared with the case in which conventional stacks are installed, irrespective of whether the stacks are employed for accommodating books or any other articles, because of the fact that any extra air space to be air-conditioned is eliminated according to the present invention.

Other objects, features and advantages of the present invention will become apparent from the following detailed description when taken in conjunction with the accompanying drawings, in which.

Figure 1:
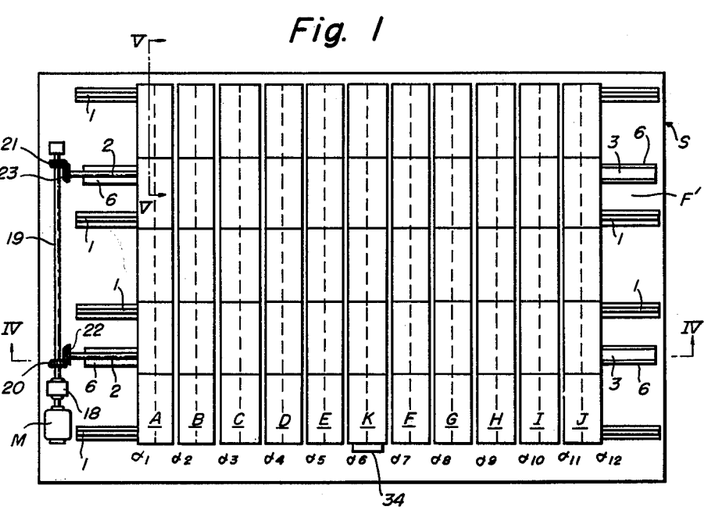
FIG. 1 is a plan view of a shiftable stack assembly embodying the present invention.
Figure 2:
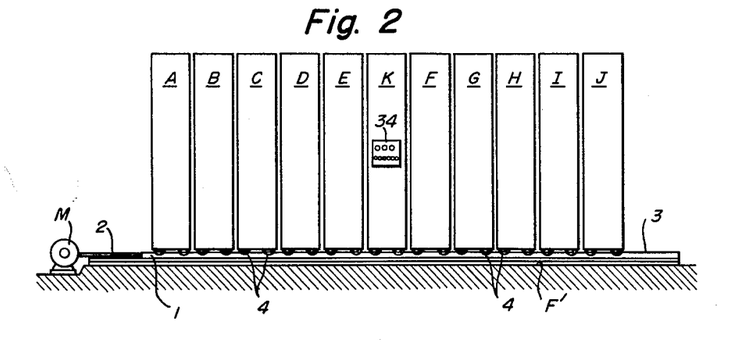
FIG. 2 is a front view of the stack assembly shown in FIG. 1.

Referring first to FIGS. 1 and 2, there is shown a stack assembly installed in a stack room S and comprising composite shelves or stacks A, B, C, D, E, F, G, H, I, J and K each made of steel and, for example, having a depth of 50 centimeters and a length of 450 centimeters. The stacks are arranged side by side on four spaced parallel rails 1 extending on the floor F' in the transverse direction and are transversely reciprocable by transferring means including a motor M arranged suitably in one corner of the stack room, threaded drive rods 2 driven from the motor M and shifting bars 3 having a nut or like internally threaded member to be driven by said drive rod.

With the stack assembly illustrated, only the central stack K is stationary and the arrangement of rails, drive rods, electromagnetically-operated pins and other elements is such that any desired number of the stacks A, B, C, D, E located to the left of the stack K or those F, G, H, I, J located to the right thereof may be shifted by a distance corresponding to the required aisle width to form an aisle at the desired location.

Reference characters $\alpha_1$, $\alpha_2$, $\alpha_3$, . . . $\alpha_{12}$ indicate positions which may be assumed by such aisle as formed by the shifting or transverse movement of the stack or stacks.

Figure 3:
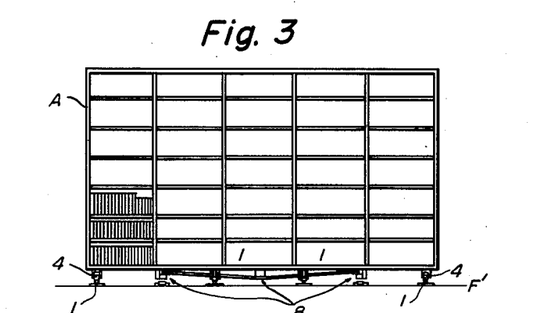
FIG. 3 is a side view of the stack assembly shown in FIG. 1.
Figure 5:
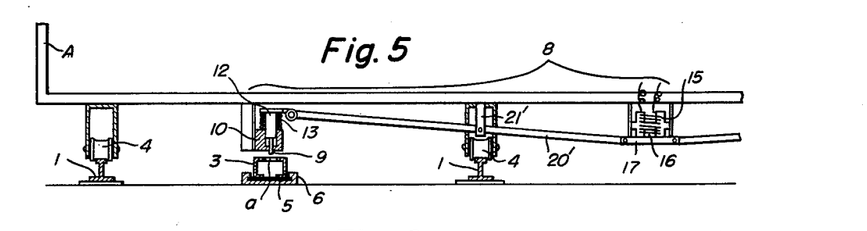
FIG. 5 is an enlarged cross-sectional side elevation of the bottom portion of the stack assembly taken along the line V—V in FIG. 1 and showing the stack shifting mechanism thereof.

As shown in FIGS. 2, 3 and 5, four pairs of tandem-arranged rollers or wheels 4 are journaled on the underside of each of the stacks A–E and F–J so as to be placed on respective rails 1.

Figure 4:
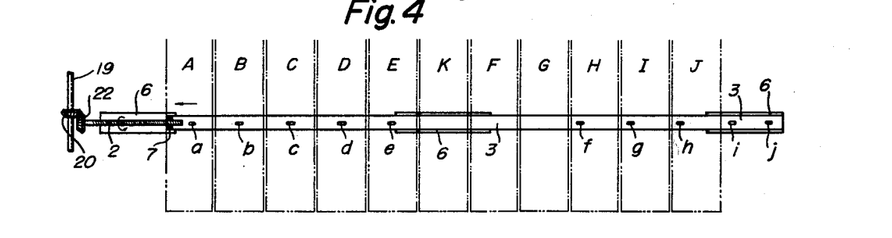
FIG. 4 is an enlarged fragmentary plan view of the stack assembly showing the structure of the shifting bar assembly in detail.

Description will now be made on the shifting bar mechanism with reference to FIG. 1. As shown, two shifting bars 3 are arranged beneath the stacks A–J in parallel with the rails 1. The shifting bars 3 each have a body, for example, of C-section steel as seen in FIGS. 4 and 5 and are installed with the back of C-section facing upwardly. A slide plate 5 is welded to the opposite end portions of the C-section. The back or top wall portion of the C-section is formed with apertures $a$, $b$, $c$, . . . $j$ for receiving respective solenoid-operated detent pins, which extend from the respective shiftable book-stacks medially thereof. The apertures $a$–$e$ in the C-section are positioned so that they are immediately below the respective centers of the stacks A–E when shifted to the right as shown in FIG. 1 while the apertures $f$–$j$ are positioned so that they are immediately below the respective centers of the stacks F–J when shifted to the right. Secured to one end of the C-section is a nut or internally threaded block 7, which is in threaded engagement with the externally threaded drive rod. The slide plate 5 is slidably fitted in a guide rail 6 laid on the floor F′ in parallel with the rails 1 and having a substantially C-shaped section as shown (FIG. 5). It will be understood that the shifting bars 3 are reciprocatorily moved right and left as viewed in FIG. 1 by rotating in either direction said drive rods 2, which are in threaded engagement with the nuts or internally threaded blocks 7 of the respective slidable shifting bars.

Shifting of the book-stacks may be effected by selectively connecting them with the shifting rod 3 as described below.

Electromagnetically operated pin devices 9, one of which is shown in FIG. 5, are provided for such selective connection. In FIG. 5, a block 10 is shown supported by a bracket depending from the underside of the book-stack A, which is shiftable, above the aperture $a$ in the shifting bar 3. The block 10 is formed with a vertical cylindrical bore, in which an enlarged portion of a pin 9 having a member 12 at its upper end is housed for vertical sliding movement. The block 10 is positioned so that when the book-stack A is shifted to the right as shown in FIG. 4 the pin 9 is aligned with the aperture $a$ formed in the shifting bar 3. The pin 9 is normally biased upwardly by a spring 13. An electromagnetic device is provided on the underside of the book-stack A in the center thereof and comprises an electromagnet 15 secured to the underside of the stack A and an iron core 16, which is attracted to the electromagnet when the latter is energized. As shown the iron core 16 is secured to a member 17. A further bracket is secured to the underside of the book-stack A intermediate the electromagnetic device and the pin 9 and a long lever 20′ is pivoted intermediate its ends to the bottom 21′ of the bracket and at opposite ends to said member 17 at the bottom of iron core 16 and said member 12 at the top end of said pin 9. With such arrangement, if the electromagnet 15 is energized with the book-stack A positioned as shown in FIG. 4, the pin 9 is lowered against the bias of the spring 13 to fit in the aperture A. It is to be understood that another pin assembly 9, not shown, is arranged symmetrically on the opposite side of the electromagnetic device and the two pin assemblies 9 are actuated simultaneously by means of the single electromagnet. All of the remaining shiftable stacks are also constructed in the same manner as the book-stack A described above. It will be appreciated therefore that any stack or stacks may be shifted along the rails 1 by energizing the electromagnets secured to the stacks to be shifted to connect the stacks to the shifting bars and rotating the respective drive rods threadably connected therewith. On this occasion, the stacks may be held in their respective rest positions by the provision of a pin secured to the bottom of the central magnetic coil on the stack bottom and a steel member secured to the floor surface immediately below the center of the stack at rest and having an aperture adapted to receive said pin, as described hereinafter with reference to FIG. 15.

When it is desired, for example, to form an aisle $\alpha_4$ (FIG. 1), the motor M is started to rotate the main shaft 19 clockwise by way of a speed change gear 18. Bevel gears 20, 21 secured to the main shaft 19 drive cooperating bevel gears 22, 23 secured to the respective adjacent ends of the drive rods 2 to rotate the latter clockwise so that the shifting bars 3 are slidingly driven to the left. Prior to the sliding movements of the shifting bars, the electromagnets 15 of the respective electromagnetically operated pin assembly 8 mounted on the underside of the respective stacks A, B and C are energized to cause the respective pins 9 to engagingly fit in the apertures $a$, $b$ and $c$ formed in the shifting bars 3. Consequently, the stacks A, B and C are transferred to the left by the shiftings bars 3 to form an aisle $\alpha_4$. In order to close this aisle $\alpha_4$, the motor M is rotated in opposite direction to shift the stacks A, B and C to the right.

Description will now be made on means for automatically controlling the shifting of the stacks constructed as described.

Figure 6:
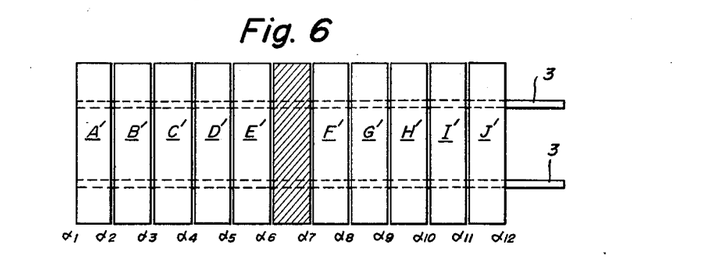
FIG. 6 is a view of the assembly similar to FIG. 1 for explanation of the automatic stack operation.
Figure 8:
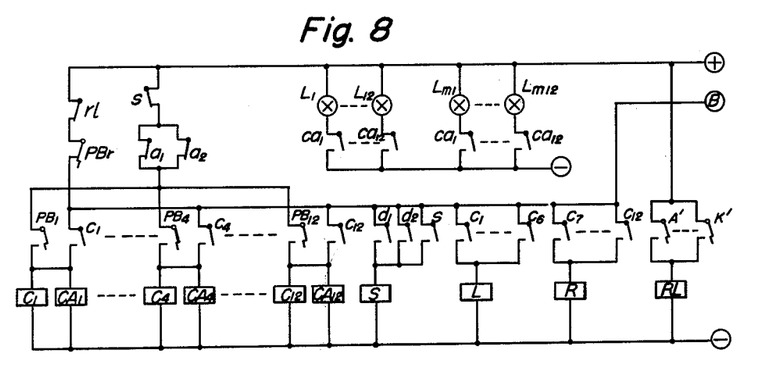
FIG. 8 is a wiring diagram of the aisle selecting circuit of the automatic control mechanism.
Figure 13:
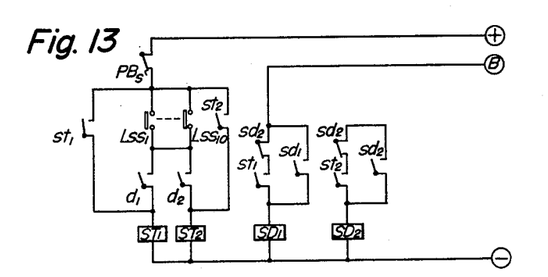
FIG. 13 is a diagram of the safety circuit of the automatic control mechanism.

Referring to FIG. 6, which illustrates a movable stack assembly when the stacks have been collected together in the center. As with the case of FIG. 1, the central stack K is stationary while the remaining stacks A–J are shiftable stacks with a space corresponding to an aisle provided to the left of the stack A as well as to the right of the stack J. Reference characters $\alpha_1$–$\alpha_{12}$ indicate positions where an aisle may be formed. FIG. 6 thus corresponds to the case where aisles $\alpha_1$ and $\alpha_{12}$ are formed. Aisle lights $Lm_1$–$Lm_{12}$ are provided above the respective aisle positions (FIG. 8). Also, provided in the respective aisle positions are pushbutton keys A–K which are operable to render the selective control inoperative during the use of any particular aisle and to restore the control circuit after the use. Mounted on the front face of each of the stacks is a bar extending the length of the associated stack for operating safety limit switches $LSS_1$–$LSS_{10}$ (FIG. 13).

Character 3 designates shifting bars for shifting the stacks.

Figure 7:
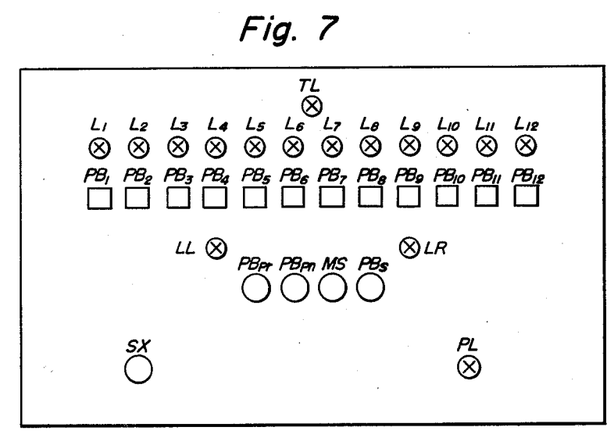
FIG. 7 is the front view of the control panel for the automatic stack operation.

In FIG. 7, which is a front view of the control panel, $PB_1$–$PB_{12}$ designate pushbutton keys for aisle selection; $L_1$–$L_{12}$ designate aisle selection indicator lamps; and LL, LR designate lamps for indicating the position of the shifting bars, the lamp LL being turned on when the bars assume their left position and the lamp LR is on when the bars are in their right-hand position.

Characters $PB_{pr}$, $PB_{pn}$ and MS indicate pushbutton keys for manual operation in cases where the power supply is resumed after the electrical operation has been interrupted, for example, because of power stoppage, $PB_{pr}$ serving for forward rotation, $PB_{pn}$ for reverse rotation and MS for quick shifting. Characters $PB_s$ indicate a pushbutton key for restoring the circuit after completion of the operation, and PL is a pilot lamp for the source of power. SX is an emergency stop pushbutton key for opening the main switch for the power source in emergency, and TL is a lamp for indicating an overcurrent of the motor or other failure.

In FIG. 8, which illustrates the aisle selection circuit, characters $PB_1$–$PB_{12}$ indicate pushbutton keys for aisle selection; A′–K′ indicate restoring pushbutton keys provided for the respective aisle positions; RL indicates a restoring relay; $C_1$–$C_{12}$, selection memory relays; $L_1$–$L_{12}$, selection indicator lamps; $Lm_1$–$Lm_{12}$, aisle illuminating lights; and $CA_1$–$CA_{12}$, relays for energizing these lights. $PB_r$ indicates a restoring pushbutton key; S, a relay operable after any one aisle has been selected and before the operation therefor has been completed to hold any other control inoperative; and L, R, relays for discriminating the right or left position of the selected aisle with respect to the stationary stack.

In the following description, contacts of any of the relays are designated by small letters corresponding to the capitals designating the particular relays.

Figure 9:
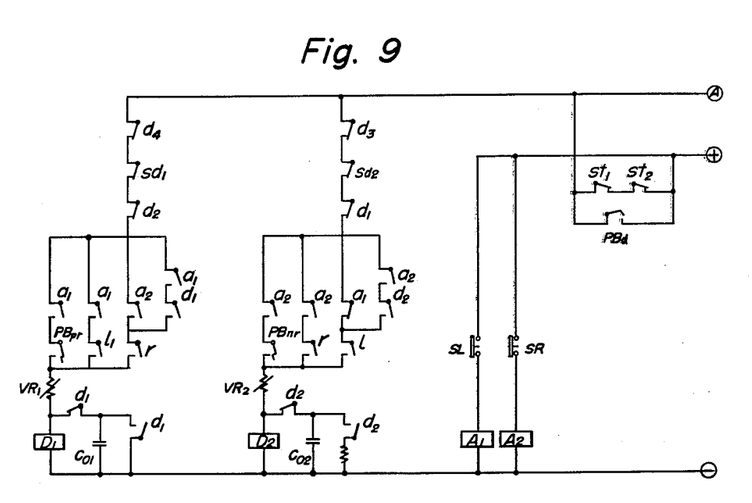
FIG. 9 is a wiring diagram of the shifting bar position discriminating circuit of the automatic control mechanism.

In FIG. 9, illustrating the shifting bar position discriminating circuit, characters SL and SR indicate limit switches arranged at the left and right ends respectively, of the shifting bar. The switches are each normally closed and opened when the shifting bar reaches the opposite ends of its traverse. $A_1$ and $A_2$ indicate shifting bar position memory relays; $D_1$, $D_2$, relays for starting control operation; $VR_1$, $VR_2$ and $CO_1$, $CO_2$, variable resistors and capacitors for obtaining the operating time limit with the respective relays $D_1$ and $D_2$; and $PB_d$, a safety operation key for interrupting the control operation if and when any person or object is clamped between the stacks during the stack shifting operation.

Figure 10:
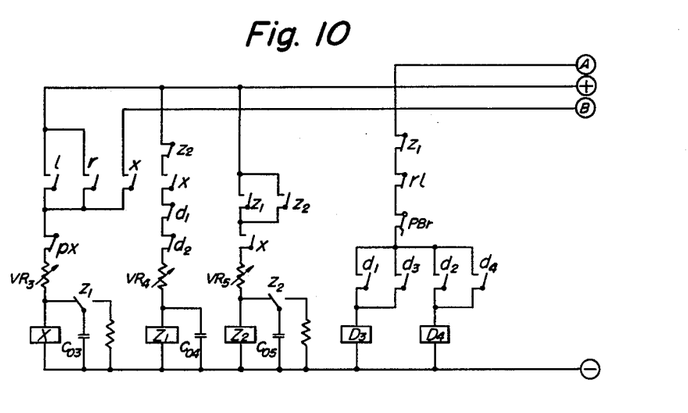
FIG. 10 is a wiring diagram of the shifting bar transfer discriminating circuit of the automatic control mechanism.

In FIG. 10, which illustrates the shifting bar transfer discriminating circuit, which is operable for aisle selection to transfer the shifting bars in the opposite direction where the bars are at first in a position not to allow controlling operation in the intended direction, character X indicates a transfer discriminating relay; $Z_1$, a transfer completing relay; $Z_2$, a relay for obtaining a time period from the transferring of the bars to the restoration of $Z_1$ and further to the starting of any selected control operation; and $D_3$, $D_4$, relays for restraining the selected control during the bar transferring and starting the selected control upon completion of the bar transferring.

Figure 11:
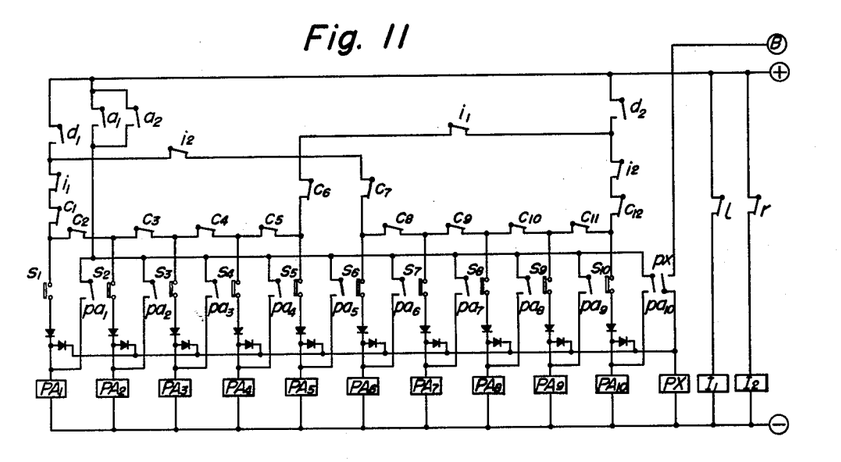
FIG. 11 is a diagram of the detent pin controlling circuit of the automatic control mechanism.

In FIG. 11, which illustrates the detent pin control circuit, characters $S_1$–$S_{10}$ indicate limit switches operable when the shifting bars are in a particular position relative to the stacks, that is, when the apertures in the shifting bars are in alignment with the detent pins carried by the respective stacks; $PA_1$–$PA_{10}$, relays for energization of the electromagnetic coils for operating the respective detent pins; PX, a relay for finding whether the shifting bars are controlled as selected or not; and $I_1$, $I_2$, relays for finding whether the selected aisle position is to the right or left of the stationary stack and for controlling the movement of the shifting bars, accordingly.

Figure 12:
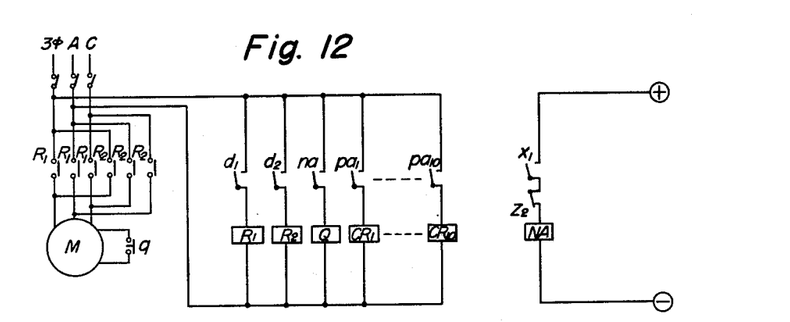
FIG. 12 is a diagram of the motor controlling circuit of the automatic control mechanism.

In FIG. 12, illustrating the motor control circuit, character M designates a three-phase induction motor; $R_1$, an electromagnetic switch for allowing the motor to rotate forwardly; $R_2$, an electromagnetic switch for motor operation in the reverse direction; NA, a relay for rapidly transferring the shifting bars; Q, a pole-changing relay for effecting the changeover of the motor to the high-speed operation; and $CR_1$–$CR_{10}$, coils of the respective electromagnetic devices for operating the respective detent pins.

FIG. 13 illustrates a safety circuit which is operable, in dangerous cases where the stacks are started to shift with a person or object lying on the aisle, to stop the stack operation and restart it upon removal of the dangerous condition. In FIG. 13, $LSS_1$–$LSS_{10}$ designate safety limit switches which are operable when the bars mounted on the front of the respective stacks and extending the length thereof are actuated; $ST_1$, $ST_2$, relays operable by the switches to interrupt the controlling operation; $SD_1$, $SD_2$, relays for restraining operation in the reverse direction in effecting the safety operation by manual operation to remove the dangerous condition; and $PB_s$, a release key for restoring the safety circuit after the safety operation has been performed to allow the controlling operation to continue.

In these figures, Ⓐ and Ⓑ indicate the connection of the lines carrying the same markings, respectively representing a secondary source of power supply through the contacts of the relays in the safety circuit for interrupting controlling operation and that through the contacts of the restoring key $PB_r$ and restoring relay $R_L$.

The controlling operation of the stack assembly will now be described. It is assumed that the assembly prior to the controlling operation is in a position as shown in FIG. 1 with the stacks collected together at the center and the shifting bars positioned at the extreme right. In this case, it will be observed that the shifting bar position discriminating limit switch SR has operated and therefore only one of the relays $A_1$ has operated. If it is desired to form an aisle $\alpha_4$, the aisle selection pushbutton $PB_4$ is depressed so that relays $C_4$ and $CA_4$ are operated to self-hold and at the same time the relay L is operated. Accordingly, the aisle selection indicator lamp $L_4$ and aisle illuminating light $Lm_4$ are turned on.

The operation of the relay L completes a circuit including the positive terminal ⊕ of the battery, $St_1(b)$, $St_2(b)$, $od_1(b)$, $d_2(b)$, $a_1(a)$, $l(a)$, $VR_1$, D and the negative terminal ⊖ of the battery to operate relay $D_1$. The limit switches $S_1$–$S_5$ are in actuated position as the shifting bar is in its right-hand position. Thus, upon operation of the relay $D_1$, the relays $PA_1$, $PA_2$ and $PA_3$ operate to self-hold so that electromagnetic coils $CR_1$, $CR_2$ and $CR_3$ are energized to operate the detent pins of the book-stacks A, B and C into engagement with the corresponding apertures in the shifting bar 3.

Meanwhile, the operation of relay $D_1$ causes operation of the electromagnetic switch $R_1$ to start rotation of the motor M in the forward direction to shift the shifting bars and hence book-stacks A, B and C in engagement therewith to the left to form an aisle $\alpha_4$. Upon completion of the movement of the shifting bars, limit switch SL operates to open its contacts thereby to restore the relay $A_1$ and subsequently the relays $D_1$, $PA_1$–$PA_3$ and $R_1$ to stop the motor M.

The use of the aisle is indicated by the selection indicator lamp $L_4$ on the control panel, which is on during the use. Even if any other person selects another aisle by mistake during the use of the aisle $\alpha_4$, no further control operation can be effected since the selection circuit has been opened upon operation of the relay S. After the use of the aisle, the entire control circuitry is restored preparatory to another controlling operation by depressing the restoring pushbutton $PB_2$ on the control panel or the restoring pushbutton D for aisle safety.

Next, it is assumed that the aisle $\alpha_9$ is desired when the stacks A–C are in their left-hand position and the shifting bars are in their right-hand position. In this case, the relay $A_1$ is in operative position and the relay $A_2$ is inoperative. Accordingly, upon depression of the aisle selecting pushbutton key $PB_9$, relays $C_9$ and $CA_9$ operate to self-hold and selection indicator lamp $L_9$ and aisle lamp $Lm_9$ are turned on. Simultaneously with this, relay R as well as relay $D_1$ operates.

In this case, though the shifting bars are in their right-hand position and limit switches $S_4$ and $S_5$ are closed, the relays $PA_4$ and $PA_5$ as well as relay PX are not operated because of the operation of the relay I, through the contacts $l$. Accordingly, after the predetermined time limit, relay X and hence relay NA operate, and then electromagnetic switch Q operates to effect the pole-changing of the motor, followed by the operation of the electromagnetic switch $R_1$ to cause the motor to rotate at higher speed in the forward direction thereby to rapidly shift the shifting bars to the left. When the shifting bars reach the left-hand position, the limit switch RL is actuated to restore relay $A_1$ and hence relays $D_1$ and $R_1$ to stop the rotation of the motor. With the relay X self-held, the restoration of relay $D_1$ causes relay $Z_1$ to operate at its predetermined time limit to restore the relay $D_3$, which previously has opened the circuit of the relay $D_2$, and this, together with the restoration of relay $D_1$ acts to operate the relay $D_2$. That is, the relay $Z_1$ serves to provide a time interval between the transfer of the shifting bars and the start of the next shifting operation. Upon operation of the relay $Z_1$, relay $Z_2$ operates to self-hold to restore the relay $Z_1$, and relay NA and subsequently electromagnetic switch Q are restored. The function of the relay $Z_2$ is to prevent re-operation of the relay $Z_1$ upon the completion of the next operation.

By the transfer of the shifting bars to the left, limit switches $S_6$–$S_{10}$ are operated and relay $A_2$ and hence $PA_8$–$PA_{10}$ operate to cause engagement of book-stacks H, I, J with the shifting bars by operation of the detent pins. Operation of the relay $D_2$ causes reverse rotation of the motor and hence the shifting bars are moved to the right to shift the stacks H, I and J to the right thereby to form an aisle $\alpha_9$. When the shifting bars reach their extreme right position, limit switch SR operates and the relay $A_2$ is restored so that relays $D_2$ and $R_2$ are restored to stop rotation of the motor. After the use of the aisle, the entire stack assembly is restored by depressing the restoring button $PB_r$ or the restoring button for aisle safety H.

As pointed out above, during the use of an aisle, depression of any pushbutton key for selection of another aisle is ineffective before the restoring pushbutton on the control panel or any of the restoring buttons arranged in the respective aisle positions has been depressed. However, in cases where a person or an object lies in the aisle when the stack shifting operation starts, limit switches $LSS_1$–$LSS_{10}$ are operated to actuate the relay $ST_1$ or $ST_2$ depending upon the direction of movement of the stacks immediately to open the circuit for operating relays $D_1$ and $D_2$ and thus stop the motor. Also, upon operation of relay $ST_1$ or $ST_2$, relay $SD_1$ or $SD_2$ is operated to self-hold. At this time, if the safety operation key $PBd$ and also manual-operation pushbutton key $PB_{pr}$ or $PB_{pn}$ are operated, the stacks are shifted in the opposite direction to relieve the dangerous state. On this occasion, even if the manual operation pushbutton key be operated inadvertently in a direction opposite to that for relieving the dangerous state, the circuit for operating the stacks in the direction inviting the dangerous state is opened by the relay $SD_1$ or $SD_2$ so that the motor cannot operate and the stacks are restrained so as to be shiftable only in the reverse direction. Upon depression of the release key PBS after the dangerous state has been relieved, the circuitry is restored into the controllable state and automatically continues to operate as before the interruption.

Figure 14:
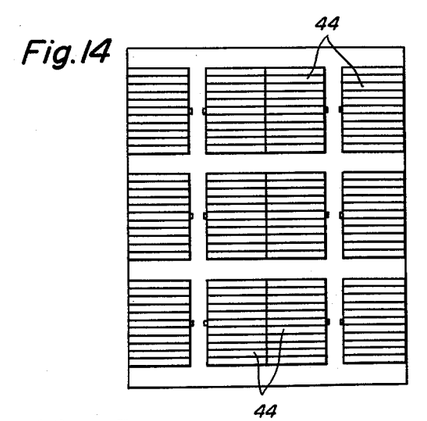
FIG. 14 is a diagrammatic plan view of the arrangement of a plurality of stack assemblies according to the present invention.

FIG. 14 illustrates one arrangement in a stack room of a plurality of movable stack assemblies according to the present invention.

Figure 15:
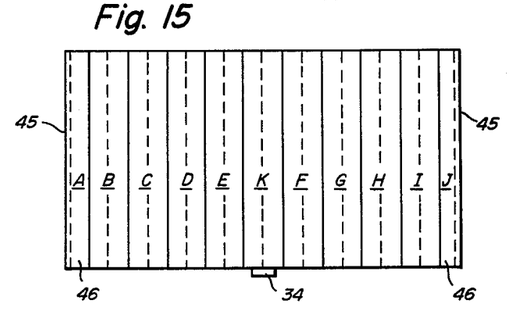
FIG. 15 is a plan view similar to FIG. 1 of a lockable modification of the stack assembly shown in FIG. 1.
Figure 16:
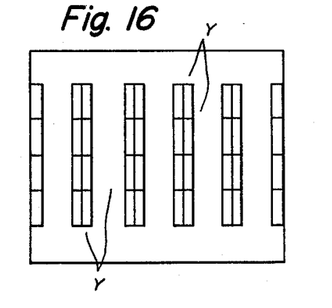
FIG. 16 is a diagrammatic plan view of conventional stacks installed in a stack room.

FIG. 15 illustrates a modified form of the stack assembly shown in FIG. 1. In this form of stack assembly, half stacks 46 each having a back panel on the outside are employed in place of ordinary stacks A, J in the assembly of FIG. 1 and a control panel 34 is provided which carries among others a starting pushbutton of the ordinary key lock type, not shown. With this arrangement, the entire stack assembly may be perfectly locked simply by collecting together all the stacks and keying the starting pushbutton.

Figure 17:
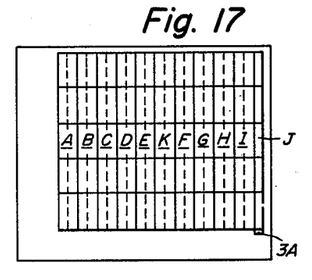
FIG. 17 is a diagrammatic plan view of another modification of the present invention.

FIG. 17 illustrates a further modification of the stack assembly according to the present invention which includes an end stack J held stationary and electrical mechanisms properly modified to suit such arrangement.

It will be apparent to those skilled in the art that the present invention is never limited to those forms described hereinbefore but various changes and modifications may be made without departing from the scope and spirit of the invention as claimed.

For instance, the inventive stack assembly may be modified so that any desired stack or stacks may be shifted by engaging the detent pins 9 by hand and starting the motor M. Further, in this case, the stacks may each be provided with a motor so as to be shifted individually.

Moreover, the main shaft 19 may be arranged for manual operation by use of a handle, eliminating the need of the automatic control mechanism, motor M and other associated elements.

The shifting bar assembly may take the form of a pinion-and-rack assembly or a chain-drive mechanism. Also, in place of using the shifting bars 3, the drive rods 2 may be directly threaded to the stacks for transferring thereof.

The pins 9 may be replaced by hooks, clips or other suitable detent means.

The rails 1 may be eliminated by making the room floor F' satisfactorily smooth.

Furthermore, the stack shifting mechanism may be arranged so that, for example, when it is desired to shift the stacks A, B, C and D to the left, the stacks A, B and C may be left free so as to be shifted under the push of the stack D, which is connected with the shifting bars 3 by way of the detent pin 9. In this case, the said electric circuitry for automatic controlling operation may suitably be simplified, as will readily be understood.

The stack assembly may be arranged to include suspended stacks or arranged so that the stacks may selectively be suspended or mounted on rails as desired. The suspension system may be provided in various forms, for example, including an upper structure carrying rails or rollers for cooperation with rollers or rails secured to the top of the stacks.

Though the invention has been described above largely in connection with its application to the library stack room, it will be understood that the inventive assembly may also be advantageously employed in the storage of documents, materials, products, or merchandise in general in firms, factories, department stores, warehouses, etc.

What is claimed is:

1. A stack assembly including a combination of a plurality of stacks for accommodating articles, said assembly comprising (1) a row of stacks each having at least one face through which articles may be taken out and put in, said stacks being arranged on a floor in side-by-side relation in a manner such that said faces of adjacent stacks are parallel to each other and being normally arranged closely adjacent to each other, and the face of any stack being made accessible for the taking out and putting in of articles therethrough by forming an aisle in front of the face by shifting at least one stack lying at the face by a distance corresponding to the width required of the aisle; (2) means for supporting said stacks in a manner such as to allow them to be shifted relative to each other in a direction normal to the faces and thus to move said faces of the adjacent stacks toward and apart from each other, and (3) shifting means for simultaneously shifting at least one of said stacks as selected, said shifting means including (i) at least one longitudinally slidable shifting bar extending for the depth of all of said stacks normally to the faces thereof and characterized by a plurality of apertures in longitudinally spaced array, said shifting bar being slidable with respect to each of the stacks of said row of stacks, (ii) means for transferring said shifting bar in longitudinal direction, and (iii) means for connecting selected ones of said stacks to be shifted to said shifting bar, said connecting means comprising electromagnetically actuated pin means mounted on said respective stacks and adapted to enter the apertures in said shifting bar.

2. A stack assembly as set forth in claim 1 in which said longitudinally slidable shifting bar extends below the bottom of all of said stacks.

3. A stack assembly as set forth in claim 1 in which on each stack said pin is vertically movable; said iron core is vertically movable, and said lever has pivoted connections to said pin at the upper end thereof and said iron core at the lower end thereof, and is pivotally mounted on said stack at a location in its, the lever's, own length in between its pivoted connections to said pin and said iron core.

4. A stack assembly as set forth in claim 1 in which on each stack said biasing means comprises a coil spring surrounding and acting substantially directly upon said pin.

5. A stack assembly including a combination of a plurality of stacks for accommodating articles, said assembly comprising (1) a row of stacks each having at least one face through which articles may be taken out and put in, said stacks being arranged on a floor in side-by-side relation so that said faces of adjacent stacks are parallel to each other and being normally arranged closely adjacent to each other, and the face of any stack being made accessible for the taking out and putting in of articles therethrough by forming an aisle in front of the face by shifting at least one stack lying at the face by a distance corresponding to the width required of the aisle; (2) means for supporting said stacks in a manner such as to allow them to be shifted relative to each other in a direction normal to the faces and thus to move said faces of the adjacent stacks toward and apart from each other, and (3) shifting means for simultaneously shifting at least one of said stacks as selected, said shifting means including (i) first and second longitudinally slidable shifting bars in parallel spaced relation, each extending below the bottom of all of said stacks normally to the faces thereof and characterized by a plurality of apertures in longitudinally spaced array, (ii) means for transferring said shifting bars in longitudinal direction, said transferring means comprising a motor, first and second threaded members adapted to be rotatively driven by said motor, and members secured to said first and second shifting bars for threadable engagement with said first and second threaded members respectively, and (iii) means for connecting selected ones of said stacks to be shifted to said shifting bars, said connecting means comprising (a) first and second pins mounted on each of said stacks and movable vertically toward and away from said first and second shifting bars respectively to enter and leave the apertures in said bars, (b) an electromagnet mounted on each of said stacks substantially midway between said pins thereon, said electromagnet being of generally cylindrical form with a hollow and vertically oriented axial region, (c) an iron core vertically movably located within the axial region of said electromagnet, (d) a first lever pivotally mounted on each of said stacks and having pivoted connections to the first pin and the iron core thereon, the pivoted connection to said first pin being at the upper end thereof and the pivoted connection to said iron core being at the lower end thereof, and the pivotal mounting of said first lever on the stack being at a location on the lever's length in between the lever's pivoted connections to said first pin and said iron core, (e) a second lever pivotally mounted on each of said stacks and having pivoted connections to the second pin and the iron core thereon, the pivoted connection to said second pin being at the upper end thereof and the pivoted connection to said iron core being at the lower end thereof, and the pivotal mounting of said second lever on the stack being at a location on the lever's length in between the lever's pivoted connections to said second pin and said iron core, and (4) biasing means acting between each of said stacks and the linkage thereon comprising first and second pins, first and second levers, and an iron core, and tending to maintain each of said linkages in such attitude that each of said first and second pins is withdrawn from any aperture in said shifting bars in the absence of energizing current being supplied to the electromagnet corresponding to the particular first and second pins.

6. A stack assembly including a combination of a plurality of stacks for accommodating articles, said assembly comprising (1) a row of stacks each having at least one face through which articles may be taken out and put in, said stacks being arranged on a floor in side-by-side relation in a manner such that said faces of adjacent stacks are parallel to each other and being normally arranged closely adjacent to each other, and the face of any stack being made accessible for the taking out and putting in of articles therethrough by forming an aisle in front of the face by shifting at least one stack lying at the face by a distance corresponding to the width required of the aisle; (2) means for supporting said stacks in a manner such as to allow them to be shifted relative to each other in a direction normal to the faces and thus to move said faces of the adjacent stacks toward and apart from each other; (3) shifting means for simultaneously shifting at least one of said stacks as selected, said shifting means including (i) at least one longitudinally slidable shifting bar extending for the depth of all of said stacks normally to the faces thereof, (ii) means for transferring said shifting bar in longitudinal direction, and (iii) means for connecting selected ones of said stacks to be shifted to said shifting bar, said connecting means comprising electromagnetically-actuated pin means; (4) selection means for selecting the stack face to be made accessible; (5) a first position-discriminating means coupled to the selection means for determining the position of the stack face selected relative to a predetermined reference point and for providing a signal corresponding to the position so determined; (6) a second position-discriminating means coupled to the selection means for determining the position of the shifting bar with reference to the position of the selected stack face at the time of its selection and for providing a signal corresponding to the position so determined; (7) repositioning means responsive to signals provided by said first and second position-discriminating means for repositioning the shifting bar to a position which will allow it to be longitudinally shifted in the direction necessary to form an aisle in front of the selected stack face, and (8) means electrically connected to said selection means and said repositioning means for energizing said electromagnetically-actuated pin means associated with a stack to be shifted when these pin means are in position for connective actuation, and when the shifting bar is positioned such that it may be longitudinally shifted in the direction necessary to form an aisle in front of the selected stack face.

7. A stack assembly as set forth in claim 6 in which (1) the selection means comprises (i) a plurality of selection relays, including at least one for each stack in the row of stacks, each of which selection relays has an energizing coil, (ii) a plurality of selection switches, including at least one for each stack in the row of stacks, each of which selection switches is connected in series to the coil of a selection relay, and (iii) a first source of electrical bias connected in parallel with each series combination of a selection switch and a coil of a selection relay, whereby when a selection switch is actuated the corresponding coil of a selection relay is energized; (2) the first position-discriminating means comprises (i) a first selected stack face position relay responsive to energization of any one of the selection relays which correspond to stacks on one side of a predetermined reference point, and (ii) a second selected stack face position relay responsive to energization of any of the selection relays which correspond to stacks on another side of said predetermined reference point; (3) the second position-discriminating means comprises (i) a plurality of shifting bar position relays, each of which has an energizing coil, (ii) a plurality of shifting bar position switches, including at least one for each position of the shifting bar which is desired to be determined, each shifting bar position switch being connected in series with the coil of a shifting bar position relay and each being responsive to the position of the shifting bar such that it is actuated when the shifting bar reaches a predetermined position, and (iii) a second source of electrical bias connected in parallel with each series combination of a shifting bar position switch and a coil of a shifting bar position relay, whereby when a shifting bar position switch is actuated the corresponding coil of a shifting bar position relay is energized, and (4) the repositioning means comprises (i) actuating means responsive to the current in the coils of said first and second selected stack face position relays and to current in the coils of said shifting bar position relays for determining whether the shifting bar must be longitudinally repositioned and if so in which direction, and for providing a corresponding signal, and (ii) means responsive to the signal provided by the actuating means and coupled to the transferring means for energizing said transferring means and causing said transferring means to reposition the shifting bar in accordance with the signal provided by the actuating means.

8. A stack assembly as set forth in claim 5 in which (1) the selection means comprises (i) a plurality of selection relays, including at least one for each stack in the row of stacks, each of which selection relays has an energizing coil, (ii) a plurality of selection switches, including at least one for each stack in the row of stacks, each of which selection switches is connected in series to the coil of a selection relay, and (iii) a first source of electrical bias connected in parallel with each series combination of a selection switch and a coil of a selection relay, whereby when a selection switch is actuated the corresponding coil of a selection relay is energized, and (2) the means for energizing the electromagnetically-actuated pin means comprises (i) a plurality of connecting pin alignment switches, including at least one for each stack in the row of stacks to be shifted, each such switch being actuated when a connecting pin associated with a stack to be shifted is in position for connective actuation, and (ii) a plurality of connecting pin control relays, including at least one for each stack in the row of stacks, each such relay having an energizing coil connected in series with a pin alignment switch, and each being responsive to current in the coil of the selection relay for a stack to be shifted, and also to the connecting pin alignment switch for a stack to be shifted.

9. A stack assembly as set forth in claim 6 in which said second position-discriminating means comprises (i) a first shifting bar position switch which is actuated when the slidable shifting bar is at one extremity of its longitudinal line of travel, and (ii) a second shifting bar position switch which is actuated when the shifting bar is at the other extremity of its longitudinal line of travel, whereby a signal is provided when the shifting bar reaches either extremity of its line of travel.

10. A stack assembly as set forth in claim 6 in which the means for transferring the shifting bar in longitudinal direction comprises a motor, a threaded member adapted to be rotatively driven by said motor, and a member secured to said shifting bar for threadable engagement with said threaded member, and in which the stack assembly further comprises means for controlling the speed and the direction of rotation of the motor, which means is connected in signal transmitting relation to said transferring means.

11. A stack assembly including a combination of a plurality of stacks for accommodating articles, said assembly comprising (1) a row of stacks each having at least one face through which articles may be taken out and put in, said stacks being arranged on a floor in side-by-side relation in a manner such that said faces of adjacent stacks are parallel to each other and being normally arranged closely adjacent to each other, and the face of any stack being made accessible for the taking out and putting in of articles therethrough by forming an aisle in front of the face by shifting at least one stack lying at the face by a distance corresponding to the width required of the aisle; (2) means for supporting said stacks in a manner such as to allow them to be shifted relative to each other in a direction normal to the faces and thus to move said faces of the adjacent stacks toward and apart from each other; (3) shifting means for simultaneously shifting at least one of said stacks as selected, said shifting means including (i) at least one longitudinally slidable shifting bar extending for the depth of all of said stacks normally to the faces thereof, (ii) means for transferring said shifting bar in longitudinal direction, and (iii) means operative between said stacks and said shifting bar for connecting selected ones of said stacks to be shifted to said shifting bar, said connecting means comprising electromagnetically-actuated pin means; (4) selection means for selecting the stack face to be made accessible; (5) means electrically connected to said selection means for energizing said electromagnetically-actuated pin means associated with a stack to be shifted when these pin means are in position for connective actuation, and when the shifting bar is positioned such that it may be longitudinally shifted in the direction necessary to form an aisle in front of the selected stack face, and (6) safety means associated with aisle selection and stack movement, said safety means including (i) means coupled to the selection means for rejecting an aisle selection made subsequent to a prior aisle selection until the aisle first selected has been formed, and (ii) means carried by each stack which is responsive to the presence of an object in an aisle for interrupting the shifting of the stacks in the stack assembly by said transferring means until the object is removed.

12. A stack assembly including a combination of a plurality of stacks for accommodating articles, said assembly comprising (1) a row of stacks each having at least one face through which articles may be taken out and put in, said stacks being arranged on a floor in side-by-side relation in a manner such that said faces of adjacent stacks are parallel to each other and being normally arranged closely adjacent to each other, and the face of any stack being made accessible for the taking out and putting in of articles therethrough by forming an aisle in front of the face by shifting at least one stack lying at the face by a distance corresponding to the width required of the aisle; (2) means for supporting said stacks in a manner such as to allow them to be shifted relative to each other in a direction normal to the faces and thus to move said faces of the adjacent stacks toward and apart from each other; (3) shifting means for simultaneously shifting at least one of said stacks as selected, said shifting means including (i) at least one longitudinally slidable shifting bar extending for the depth of all of said stacks normally to the faces thereof, (ii) means for transferring said shifting bar in longitudinal direction, and (iii) means operative between said stacks and said shifting bar for connecting selected ones of said stacks to be shifted to said shifting bar, said connecting means comprising electromagnetically-actuated pin means; (4) selection means for selecting the stack face to be made accessible; (5) means electrically connected to said selection means for energizing said electromagnetically-actuated pin means associated with a stack to be shifted when these pin means are in position for connective actuation, and when the shifting bar is positioned such that it may be longitudinally shifted in the direction necessary to form an aisle in front of the selected stack face, and (6) means for illuminating the selected stack face and the aisle formed adjacent thereto, said illuminating means including (i) a plurality of aisle lights including at least one aisle light proximate to each stack face of the stack assembly through which articles are to be taken out and put in, and (ii) means coupled to the selection means and connected to said aisle lights in selective energizing relation for energizing the particular aisle light which is proximate to the stack face which has been selected.

13. A stack assembly including a combination of a plurality of stacks for accommodating articles, said assembly comprising (1) a row of at least three stacks each having at least one face through which articles may be taken out and put in, said stacks being arranged on a floor, with an intermediate one of said stacks being in fixed position with respect to said floor, in side-by-side relation in a manner such that said faces of adjacent stacks are parallel to each other and being normally closely adjacent to each other, and the face of any stack being made accessible for the taking out and putting in of articles therethrough by forming an aisle in front of the face by shifting at least one stack lying at the face by a distance corresponding to the width required of the aisle; (2) means for supporting said stacks in a manner such as to allow them to be shifted relative to each other in a direction normal to the faces and thus to move said faces of the adjacent stacks toward and apart from each other, and (3) shifting means for simultaneously shifting at least one of said stacks as selected, said shifting means including (i) at least one longitudinally slidable shifting bar extending for the depth of all of said stacks normally to the faces thereof and characterized by a plurality of apertures in longitudinally spaced array, (ii) means for transferring said shifting bar in longitudinal direction, and (iii) means for connecting selected ones of said stacks to be shifted to said shifting bar, said connecting means comprising electromagnetically operated pin means mounted on said respective stacks and adapted to enter the apertures in said shifting bar.

14. A stack assembly including a combination of a plurality of stacks for accommodating articles, said assembly comprising (1) a row of stacks each having at least one face through which articles may be taken out and put in, said stacks being arranged on a floor in side-by-side relation in a manner such that said faces of adjacent stacks are parallel to each other and being normally arranged closely adjacent to each other, and the face of any stack being made accessible for the taking out and putting in of articles therethrough by forming an aisle in front of the face by shifting at least one stack lying at the face by a distance corresponding to the width required of the aisle; (2) means for supporting said stacks in a manner such as to allow them to be shifted relative to each other in a direction normal to the faces and thus to move said faces of the adjacent stacks toward and apart from each other, and (3) shifting means for simultaneously shifting at least one of said stacks as selected, said shifting means including (i) at least one longitudinally slidable shifting bar extending for the depth of all of said stacks normally to the faces thereof and characterized by a plurality of apertures in longitudinally spaced array, (ii) means for transferring said shifting bar in longitudinal direction, said transferring means comprising a motor, a threaded rod adapted to be rotatively driven by said motor, and a threaded block secured to said shifting bar with which said rod is in threaded engagement, and (iii) means for connecting selected ones of said stacks to be shifted to said shifting bar, said connecting means comprising electromagnetically actuated pin means mounted on said respective stacks and adapted to enter the apertures in the shifting bar.

15. A stack assembly including a combination of a plurality of stacks for accommodating articles, said assembly comprising (1) a row of stacks each having at least one face through which articles may be taken out and put in, said stacks being arranged on a floor in side-by-side relation in a manner such that said faces of adjacent stacks are parallel to each other and being normally arranged closely adjacent to each other, and the face of any stack being made accessible for the taking out and putting in of articles therethrough by forming an aisle in front of the face by shifting at least one stack lying at the face by a distance corresponding to the width required of the aisle; (2) means for supporting said stacks in a manner such as to allow them to be shifted relative to each other in a direction normal to the faces and thus to move said faces of the adjacent stacks toward and apart from each other, and (3) shifting means for simultaneously shifting at least one of said stacks as selected, said shifting means including (i) at least one longitudinally slidable shifting bar extending for the depth of all of said stacks normally to the faces thereof and characterized by a plurality of apertures in longitudinally spaced array, (ii) means for transferring said shifting bar in longitudinal direction, and (iii) means for connecting selected ones of said stacks to be shifted to said shifting bar, said means comprising electromagnetically actuated pin means mounted on said respective stacks and adapted to enter the apertures in said shifting bar and including (a) at least one pin mounted on each of said stacks and movable with respect thereto toward and away from said shifting bar to enter and leave the apertures in said bar, (b) at least one electromagnet mounted on each of said stacks, said electromagnet being of generally cylindrical form with a hollow axial region, (c) an iron core movably located within the hollow axial region of said electromagnet, (d) a lever pivotally mounted on each of said stacks and having pivoted connections to the pin and the iron core thereon, and (e) biasing means acting between each of said stacks and the linkage thereon comprising a pin, a lever, and an iron core, and tending to maintain each of said linkages in such attitude that each of said pins is withdrawn from any aperture in said shifting bar in the absence of energizing current being supplied to the electromagnet corresponding to the particular pin.

References Cited by the Examiner
UNITED STATES PATENTS

| | | | |
|---|---|---|---|
| 2,654,489 | 10/53 | Ingold | 312—199 |
| 2,706,573 | 4/55 | Ingold | 312—199 X |
| 2,762,515 | 9/56 | Ingold | 104—162 X |
| 2,987,200 | 6/61 | Ingold | 214—16 |
| 3,055,313 | 9/62 | Stoll et al. | 104—162 |

FRANK B. SHERRY, *Primary Examiner.*
CHANCELLOR E. HARRIS, *Examiner.*